July 16, 1940.   G. P. GRANT, JR   2,208,001
HOLDER FOR COMPOSITE PHOTOGRAPHS
Filed Sept. 27, 1938
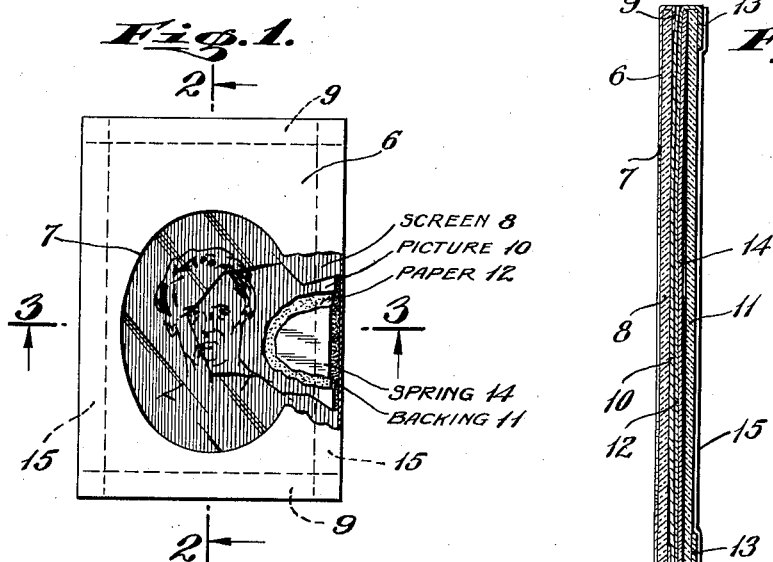
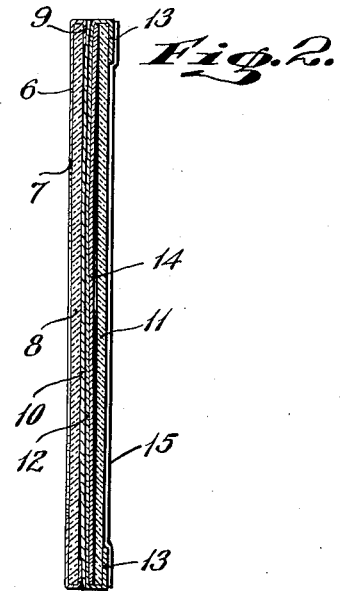
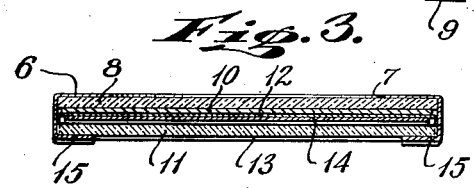
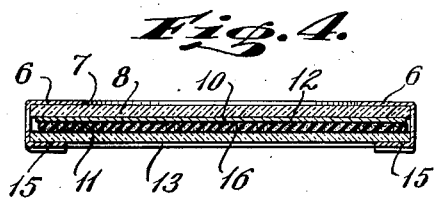
INVENTOR
GARNET PETER GRANT JR.
BY
Cousins & Cousins
ATTORNEY Patented July 16, 1940

2,208,001

UNITED STATES PATENT OFFICE 2,208,001

HOLDER FOR COMPOSITE PHOTOGRAPHS

Garnet Peter Grant, Jr., Plandome, N. Y., assignor to Grant Photo Corporation, New York, N. Y.

Application September 27, 1938, Serial No. 231,887

2 Claims. (Cl. 40—137)

This invention relates to a holder for composite photographs.

It is well known to provide a composite picture by making three exposures on a single sheet of film or sensitized paper. A screen having opaque lines is disposed between the lens of a camera and the film when an exposure is made. By moving the screen after each exposure a number of, and preferably three, exposures may be made to produce a composite picture. The finished picture is mounted in a frame behind a screen which has opaque lines similar to the screen used in the camera. Where three exposures have been made the opaque lines are twice the width of the transparent areas therebetween. For example, the transparent areas may be .005 inch in width and the opaque areas .010 inch in width. By moving the picture and the screen with relation to one another the individual views may be seen as separate rather than as composite pictures. Upon rapid movement of the parts the illusion of a moving picture is created.

The lines on the viewing screen may be horizontal but they are usually vertical, and for the purpose of the present application are considered as vertical. In order to properly view the picture it is essential that the same be in vertical alignment with the lines on the viewing screen so that in any given position only one view of the composite picture may be viewed through the screen. This result is usually attained by pasting or otherwise securing the picture upon a relatively rigid backing and then securing the backing to the screen on the front portion of the device in such a manner that only transverse or horizontal movement is permitted between the front and back members. The foregoing structure is well known but presents certain objections.

The broad object of this invention is to produce a holder which will overcome such objections.

The picture and the viewing screen are usually secured together by strips of material pasted or otherwise affixed to their longitudinal edges. If the two parts were tightly secured together it would be impossible to have relative transverse movement therebetween. Accordingly it is usual to permit sufficient slack in the securing means to allow relative transverse movement of the parts. In order that the picture be properly viewed it is essential that the picture be in intimate contact with the rear of the screen and not spaced therefrom. Where sufficient slack is permitted in the securing means to allow relative transverse movement, there is necessarily a certain clearance, even though slight, between the screen and the picture during the movement of the parts. The result of such clearance between picture and screen is that more than one view of the composite picture will be seen at one time through the screen. This produces a blur or "cloud" effect and the individual pictures of the composite picture cannot be distinguished.

One object of the present invention is to provide a holder for composite pictures in which the picture will be in intimate contact with the screen. Specifically, one object of the invention is to provide a holder for composite pictures in which a resilient member will force the picture against the screen but at the same time permit relative movement between the picture and screen.

Since the devices of the present invention are usually sold as novelties it is essential and desirable to keep down the cost of production. Accordingly, a further object of the invention is to provide a simple, inexpensive holder for displaying composite photographs which may be completely assembled with the exception of the photograph, and the photograph merely inserted at the time that it is made.

The invention consists of the construction, combination and arrangement of parts as hereinafter described and claimed.

In the accompanying drawing, forming a part hereof, are illustrated three embodiments of the invention, in which drawing similar reference characters designate corresponding parts, and in which:

Figure 1 is a front elevation, partly broken away;

Figure 2 is an enlarged vertical section taken approximately on line 2—2 of Figure 1, looking in the direction indicated by the arrows;

Figure 3 is an enlarged horizontal section taken approximately on line 3—3 of Figure 1, looking in the direction indicated by the arrows;

Figure 4 is a horizontal section similar to Figure 3, but showing a modified form of the invention; and, Figure 5 is a horizontal section similar to Figure 3, but showing a second modification of the invention.

Referring to the drawing, 6 designates the covering of a screen, the covering is flexible, preferably being of paper, and provided with an opening 7 through which the screen and picture are visible. The opening 7 may be of any desired contour to properly view a screen 8. In the drawing the transparent areas of the screen 8 have been exaggerated to clearly show the picture, but it will be understood that the opaque lines of the screen 8 are twice the width of the transparent spaces therebetween. The front cover 6 is provided with top and bottom extensions or flaps 9 which are folded over and secured to the rear of the screen 8.

A rigid backing member 11 is provided and may be made of glass or any other suitable material.

If glass, it is preferably a mirror so that the reverse of the device may serve a useful purpose. The inner face of the backing member 11 is covered with a sheet of paper or other suitable material 12 having end flaps 13 which are secured to the rear of the backing member 11. Disposed between the backing member 11 and the paper 12 is a leaf spring 14 which is curved slightly in the direction of the screen 8. In the assembly of the backing member 11 the spring 14 may be flat and slightly longer than the backing 11. When the paper 12 is applied and the ends 13 thereof secured in position the spring 14 will be slightly curved so as to present a resilient backing to the paper 12. A composite picture 10 is secured permanently to the paper 12, care being taken to have the picture 10 in vertical alignment with the lines of the screen 8.

The backing 11, the paper 12, the spring 14 and the picture 10 are all secured together as a unit. The screen 8 with its paper cover 6 constitute a second unit. The paper 6 is provided with side flaps or extensions 15 which are folded about and secured to the rear of the backing 11. Sufficient slack must be permitted in the edge sections of the flaps 15 to permit relative movement between the screen 8 and the backing member 11. When the front and rear members are in alignment, as shown in Figure 3, the clearance between the parts will be taken up by the spring 14 and the picture 10 will be held in intimate contact with the rear of the screen 8.

When the front and back portions are moved transversely with respect to one another the spring 14 will be compressed since the distance from front to back will be reduced, but the picture 10 will remain in intimate contact with the screen 8.

It will be noted that the top and bottom flaps 9 of the paper 6 are secured to the rear of the screen 8, whereas the side flaps 15 of the paper 6 are secured to the rear of the backing member 11. This construction leaves an opening or slot from top to bottom of the holder behind the screen 8 and in front of the paper 12. The entire device may be assembled at the time that the picture is made, but preferably the holder will be completely assembled with the exception of the picture 10. When it is desired to mount the picture 10 adhesive is applied to the back thereof and the picture 10 is inserted in the frame through the opening between the screen 8 and the paper 12. The paper on which the picture 10 is printed will be longer than is necessary, so that the picture 10 may be manipulated to achieve the desired alignment with the lines on the screen 8. When the picture 10 has been placed in position a slight pressure is applied to cause it to adhere firmly to the paper 12. The extended portion of the picture by which it had been handled is then cut off and the device is complete.

In the modified form as shown in Figure 4 the parts are the same with the exception that a sheet of sponge rubber 16 or similar material is substituted in the place of the spring 14. The action of the sheet 16 is the same as the spring 14 in that it maintains the picture 10 in intimate contact with the rear side of the screen 8. Sheet sponge rubber is available in which both sides are impervious to liquid and if such type is used the paper 12 with its flaps 13 may be eliminated and the sheet 16 secured directly to the backing 11 and the picture 10 secured directly to the forward face of the sheet 16. When the parts are moved transversely with relation to one another the sheet 16 will be compressed so as to permit such transverse motion.

In Figure 5 is illustrated a still further modification of the invention. A curved spring 17 is disposed in front of the screen 8 but behind the covering 6. The spring 17 is provided with a central opening corresponding to the opening 7 in the cover 6 so that the screen 8 is visible. The edges of the spring 17 are curved slightly so as to leave spaces 18 adjacent the edges of the screen 8.

When the parts are in the position as shown in Figure 5 the spring 17 will exert pressure against the flaps 15 which in turn will exert pressure on the backing 11 to hold the picture firmly against the screen 8. When the parts are moved sideways the edges of the spring 17 will be flattened to permit such movement, but will maintain the picture 10 in intimate contact with the screen 8.

In Figure 5 it will be understood that the picture 10 is securely fastened to the paper 12, which in turn is secured to the backing 11. If a backing 11 other than glass is used the picture 10 may be secured directly thereto without the use of the paper 12.

Having thus fully described the invention, what is claimed as new and desired to be secured by Letters Patent, is:

1. A composite picture and holder of the novelty type whereby relative movement of a composite picture behind a lined screen creates the illusion of movement, comprising a lined screen, a cover disposed over said screen, said cover being cut away centrally thereof to provide a viewing aperture, a backing, side flaps on said cover secured to the rear face of said backing, thereby holding the screen and backing together, a resilient member disposed upon said backing, a slot between the rear face of said screen and the front face of said resilient member, and a sheet containing the desired composite picture within said slot, said resilient member being adapted and arranged to exert a uniform pressure against said sheet, whereby it is pressed firmly against said screen, said pressure being insufficient to prevent slidable movement between said screen and said sheet.

2. A composite picture and holder of the novelty type whereby relative movement of a composite picture behind a lined screen creates the illusion of movement, comprising a lined screen, a cover disposed over said screen, said cover being cut away centrally thereof to provide a viewing aperture, a backing, side flaps on said cover secured to the rear face of said backing, thereby holding the screen and backing together, a resilient member disposed upon said backing and a second cover disposed over said resilient member, said second cover having flaps secured to said backing, a slot between the rear face of said screen and the front face of said second cover, and a sheet containing the desired composite picture within said slot, said resilient member being adapted and arranged to exert a uniform pressure against said sheet, whereby it is pressed firmly against said screen, said pressure being insufficient to prevent slidable movement between said screen and said sheet.

GARNET PETER GRANT, Jr.